United States Patent
Chen

(10) Patent No.: US 7,596,806 B2
(45) Date of Patent: Sep. 29, 2009

(54) VPN AND FIREWALL INTEGRATED SYSTEM

(75) Inventor: Jyshyang Chen, Cupertino, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 557 days.

(21) Appl. No.: 10/658,561

(22) Filed: Sep. 8, 2003

(65) Prior Publication Data

US 2006/0174336 A1    Aug. 3, 2006

Related U.S. Application Data

(60) Provisional application No. 60/408,856, filed on Sep. 6, 2002.

(51) Int. Cl.
*G06F 15/16* (2006.01)

(52) U.S. Cl. .............. 726/11; 726/12; 726/13; 713/153

(58) Field of Classification Search .......... 726/11–15, 726/2–5; 713/150–154, 168, 182, 170; 709/223–225, 709/230, 238, 227, 229; 370/229, 278
See application file for complete search history.

(56) References Cited

U.S. PATENT DOCUMENTS

| | | | | |
|---|---|---|---|---|
| 5,870,744 | A | | 2/1999 | Sprague .................. 707/9 |
| 5,968,176 | A | * | 10/1999 | Nessett et al. ............. 726/11 |
| 6,154,839 | A | | 11/2000 | Arrow et al. .............. 713/154 |
| 6,182,226 | B1 | | 1/2001 | Reid et al. ................ 713/201 |
| 6,226,748 | B1 | | 5/2001 | Bots et al. ................ 713/201 |
| 6,304,973 | B1 | | 10/2001 | Williams ................. 713/201 |
| 6,453,419 | B1 | | 9/2002 | Flint et al. ............... 713/201 |
| 6,477,646 | B1 | * | 11/2002 | Krishna et al. ............ 713/189 |
| 6,550,012 | B1 | | 4/2003 | Villa et al. ............... 713/201 |
| 6,609,148 | B1 | | 8/2003 | Salo et al. ............... 709/217 |
| 6,625,150 | B1 | | 9/2003 | Yu ........................ 370/389 |
| 6,631,466 | B1 | * | 10/2003 | Chopra et al. ............. 712/300 |
| 6,687,833 | B1 | * | 2/2004 | Osborne et al. ............ 726/23 |
| 7,003,118 | B1 | * | 2/2006 | Yang et al. .............. 380/287 |
| 7,047,561 | B1 | * | 5/2006 | Lee ...................... 726/12 |
| 7,107,464 | B2 | * | 9/2006 | Shapira et al. ............ 726/15 |
| 2002/0069356 | A1 | * | 6/2002 | Kim ...................... 713/160 |
| 2002/0083344 | A1 | * | 6/2002 | Vairavan ................. 713/201 |
| 2002/0108059 | A1 | * | 8/2002 | Canion et al. ............. 713/201 |
| 2002/0116644 | A1 | * | 8/2002 | Richard .................. 713/201 |
| 2004/0010712 | A1 | * | 1/2004 | Hui et al. ................ 713/201 |
| 2004/0022253 | A1 | * | 2/2004 | Foschiano et al. ......... 370/395.54 |

FOREIGN PATENT DOCUMENTS

CN        1147738        4/1997

OTHER PUBLICATIONS

English translation of Office Action from related Chinese application dated Nov. 3, 2006, 3 pages.

* cited by examiner

*Primary Examiner*—Kimyen Vu
*Assistant Examiner*—Nirav Patel
(74) *Attorney, Agent, or Firm*—Grossman, Tucker, Perreault & Pfleger, PLLC

(57) ABSTRACT

The present invention provides an integrated VPN/firewall system that uses bath hardware (firmware) and software to optimize the efficiency of both VPN and firewall functions. The hardware portions of the VPN and firewall are designed in flexible and scalable layers to permit high-speed processing without sacrificing system security. The software portions are adapted to provide interfacing with hardware components, report and rules management control.

14 Claims, 4 Drawing Sheets

VPN AND FIREWALL INTEGRATED SYSTEM

This application claims priority to U.S. Provisional Application Ser. No. 60/408,856, filed Sept. 6, 2002, the teachings of which are hereby incorporated by reference in its entirety.

FIELD OF THE INVENTION

The present invention relates to networking systems, and more particularly, to an integrated firewall and VPN system. Utility for the present invention can be found in any LAN/WAN environment where VPN and/or firewall capabilities are utilized.

SUMMARY OF THE INVENTION

In one aspect, the present invention provides an integrated firewall/VPN system that includes at least one wide area network (WAN) and at least one local area network (LAN). An integrated firewall/VPN chipset is provided that is adapted to send and receive data packets between the WAN and said LAN. The chipset includes a firewall portion configured to provide access control between the WAN and the LAN and a VPN portion configured to provide security functions for data between the LAN and the WAN. The firewall includes firewall hardware and software portions wherein at least the firewall hardware portion is configured to provide iterative functions associated with said access control. The VPN portion includes VPN hardware and software portions wherein at least VPN hardware portion is configured to provide iterative functions associated with the security functions.

In another aspect, the present invention provides firewall/VPN integrated circuit (IC) that includes a router core configured to interface between at least one untrusted network and at least one trusted network to send and receive data packets between the untrusted and the trusted networks. The IC also includes a firewall system configured to provide access control between the untrusted and trusted networks, and includes firewall hardware and software portions wherein at least said firewall hardware portion is configured to provide iterative functions associated with access control. The IC further includes a VPN engine configured to provide security functions for data between the untrusted and trusted networks, and includes VPN hardware and software wherein at least said VPN hardware portion is configured to provide iterative functions associated with the security functions.

One exemplary method according to the present invention includes a method of providing firewall access control functions, comprising the steps of defining one or more access control protocols; receiving a data packet; selecting a certain number of bytes of said data packet; and processing said selected bytes using said access control protocols.

The integrated firewall and VPN of the present invention is adapted to deliver complete suits of Internet security solutions, consolidated network management and comprehensive accounting loggings report based on traffic flow. In addition, the present invention offers protection from Internet threats since the VPN tunnel connection receives inherent firewall protection. Common DOS (denial of service) attacks that might compromise a stand-alone VPN gateway are detected and properly handled with the integrated firewall.

The present invention includes embedded concurrent policies to provide fine granular security to be applied to VPN traffic, thereby providing access control for all traffic. Both firewall and VPN can share the same user identification, and therefore individuals and predefined groups can have the same level of security services to access the resources they entitled.

Database updates and security policy management can be simultaneously applied to both VPN and firewall, which can reduce the impact latency in complicated network environment and provide centralized management and simpler configuration of the system. Therefore, network management does not have to maintain user identification across multiple systems.

The present invention firewall/VPN integrated system can control bandwidth management by every individual policy. By adjusting firewall policies the present invention also can efficiently effect the VPN channel bandwidth management.

Further security can be implemented by integrating the policy based NAPT with tunnel mode of encapsulation in IPsec VPN.

It will be appreciated by those skilled in the art that although the following Detailed Description will proceed with reference being made to preferred embodiments, the present invention is not intended to be limited to these embodiments. It should be understood from the outset that the present invention shall make use of the terms "software" or "modular processes", and the such terms shall be construed broadly as encompassing one or more program processes, data structures, source code, program code, etc., and/or other stored data on one or more conventional general purpose and/or proprietary processors, that may include memory storage means (e.g. RAM, ROM) and storage devices (e.g. computer-readable memory, disk array, direct access storage). Alternatively, or additionally, such methods or modular processors may be implemented using custom and/or off-the-shelf circuit components arranged in a manner well-understood in the art to achieve the functionality stated herein.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
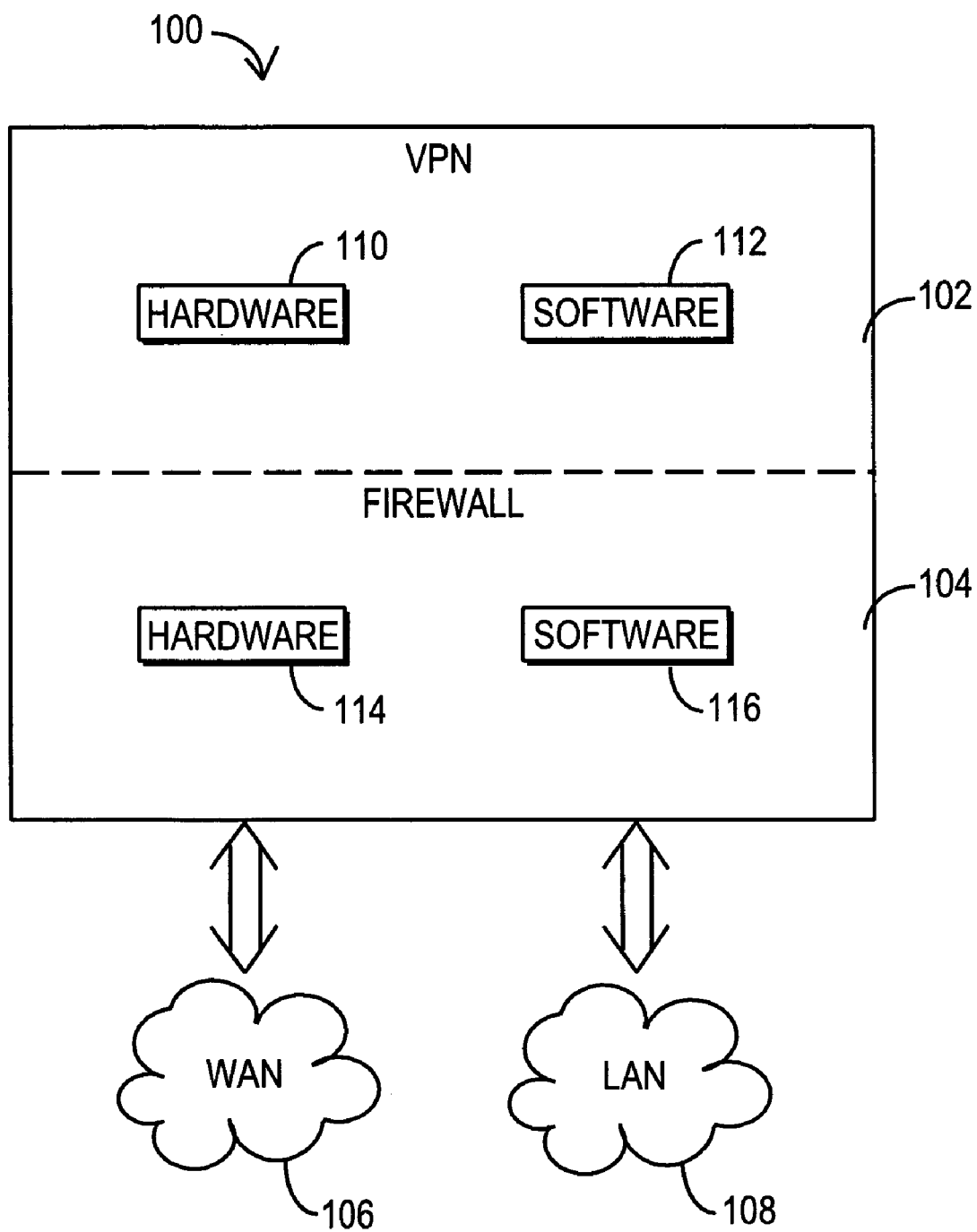
FIG. 1 is a generalized block diagram of the firewall/VPN integrated system according to the present invention.

FIG. 1 depicts a generalized block diagram of the firewall/VPN integrated system 100 according to the present invention. In one exemplary embodiment, the system 100 includes a VPN portion 102 and a firewall portion 104 that operate to monitor traffic between the WAN 106 and LAN 108. The VPN portion 102 generally operates to provide secure encryption/decryption of packet data between gateways on the WAN side. The VPN portion includes hardware 110 and software 112 to provide encryption/decryption using conventional and/or proprietary encryption/decryption algorithms (processes), as is well understood in the art. The firewall portion 104 monitors traffic between the LAN and WAN (in a manner well understood in the art) and generally includes both hardware 114 and software 116 to monitor traffic. The present invention optimizes hardware and software to achieve both integrated functionality of VPN and firewall functions, and to increase performance of the data flow on a system-wide level.

Figure 2:
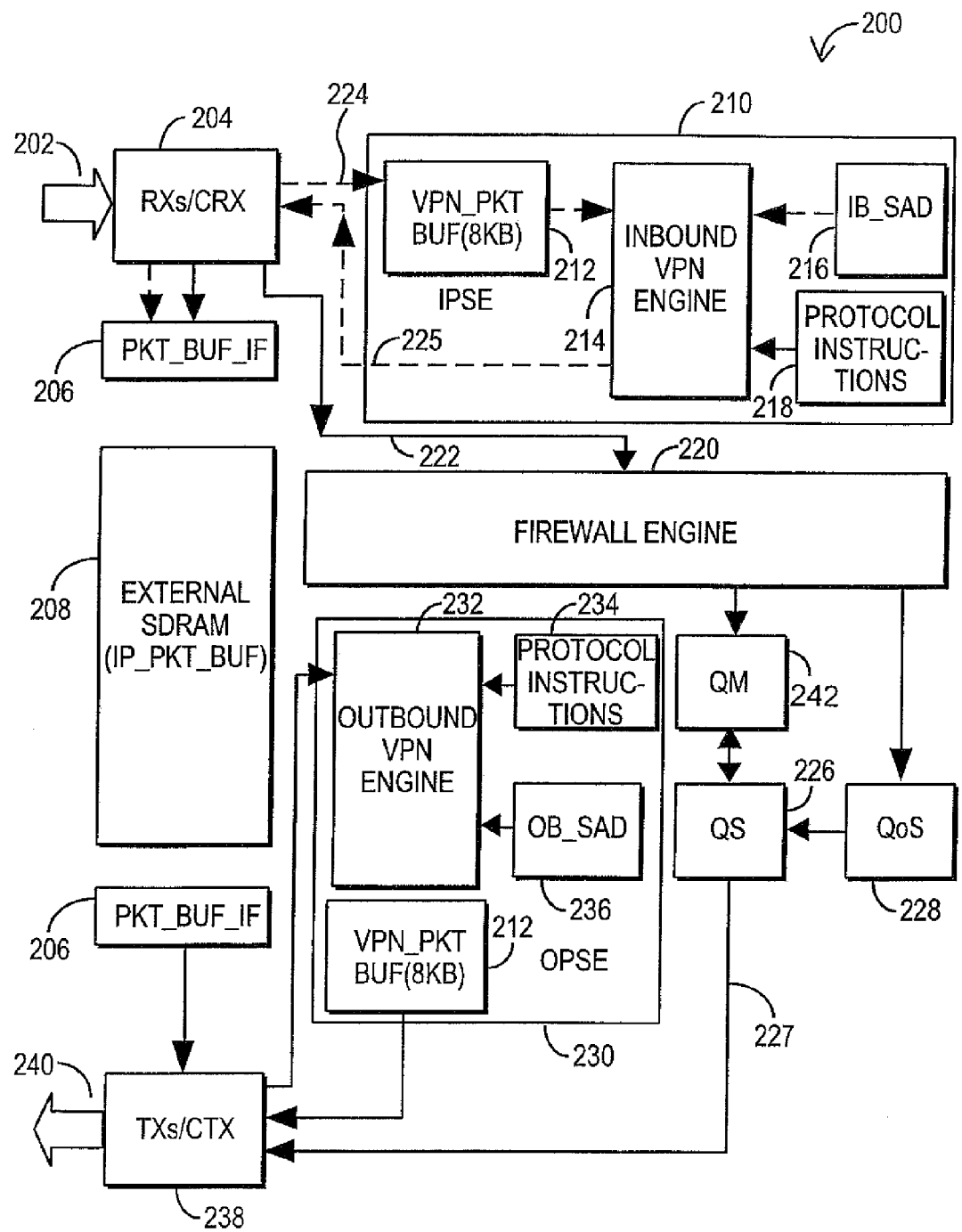
FIG. 2 is a functional block diagram of the firewall/VPN integrated system according to the present invention.

FIG. 2 depicts a functional block diagram 200 of the firewall/VPN integrated system according to the present invention. The diagram 200 depicts data flow and processes for both the VPN portion and the firewall portion. Incoming data (in the form of a packet stream) 202 from the LAN or WAN is received by the network interface 204. In the exemplary embodiment, the interface 204 is configured to interface with the protocols used in the particular LAN/WAN environment, as is understood in the art. The interface 204 receives a packet stream and places the data into a packet buffer memory 206. Additionally, the system may be configured with additional and/or external memory 208 (e.g., Flash memory, SDRAM, etc.) which is configured to temporarily store the packet data. In the exemplary embodiment, the external memory 208 is adapted to store IP data packets.

The interface 204 determines if the incoming data is plain text (from the LAN) or cipher text (from the WAN). If the data is plain text (meaning the data has come in from the LAN side), then the interface 204 is adapted to forward (along data path 222) a preselected number of bytes to the firewall 220. In the exemplary embodiment, the first 144 bytes of data from the packet stream are selected since these bytes contain Layer 2 through Layer 7 headers and content information. However, 144 bytes is only exemplary and may be some other preselected value, depending on, for example, the desired level of security or efficiency of the firewall. If the interface 204 determines that the incoming data 202 is cipher text (i.e., encrypted data coming in from the WAN side), then the incoming data stream is sent to the inbound VPN engine 210.

The inbound VPN engine 210 generally includes decryption and decapsulation processing to convert cipher text into a plain text IP packet. As will be described more fully below with reference to FIG. 3, the VPN portion of the present invention utilizes both hardware and software to enhance the efficiency of the VPN engine. The incoming data along path 224 is placed into a conventional buffer 212. An inbound VPN processor 214 processes the data to decrypt and decapsulate the data. An inbound security associate database 216 is provided that includes a database of tunnels that associate two gateways on the WAN side, in a manner known in the art. The processor 214 uses the tunnel information in the database 216 to decrypt and decapsulate the incoming data. Also, protocol instructions 218 may be provided that includes microcodes to instruct the processor 214 to decrypt and/or decapsulate the data according to conventional and or user-defined security procedures. Once the message is decrypted and/or decapsulated, the resultant plain text (IP Packet) data is sent to the interface 204 along data path 225. In a manner described above, preselected bytes (e.g., the first 144 bytes) of the data are forwarded to the firewall 220 along path 222.

The firewall 220 receives the preselected number of bytes from the interface 204 to begin the process of packet filtering and routing. As will be described more fully below with reference to FIG. 3, the firewall portion of the present invention utilizes both hardware and software to enhance the efficiency of the firewall. The firewall operates in a conventional manner to analyze incoming data according to preset or user-defined security policies. Such security policies are well understood in the art and may include conventional and/or proprietary security policies. The firwewall essentially operates to provide access control between an untrusted network (WAN) and a trusted network (LAN).

In the present invention, the firewall 220 is adapted with appropriate hardware and software to analyze the preselected data instead of having to operate on the entire data packet. This can increase the overall speed and efficiency of the firewall. Those skilled in the art will recognize that larger portions of preselected data will increase security, but may tend to slow down the firewall processing. Therefore, the present invention permits users to "tune" the firewall settings to meet desired security and/or speed requirements.

Once the data has passed the security policies, the present invention may also be configured with quality management 242 and quality of service 226 processing. The quality management processing manages the packet buffer 206 to maintain the links between queued packets stored in the memory. Quality of services 226 operates as a packet priority scheduler and will receive information from the quality of service mapping and processor 228. Essentially, and as understood in the art, quality of service analyzes the type of data coming in to determine which goes out first, based on, for example, data type (voice, IP, video, etc.) or bandwidth considerations on the network. Quality of service may also be configured to determine the best path across the network for the data.

As a general matter, if data leaving the firewall is destined for the LAN, then the quality service process proceeds as described above and upon completion transmits a control signal 227 to the output interface 238 to instruct the packet buffer 208 to release the data. If data leaving the firewall is destined for the WAN, it may require encryption/encapsulation before being forwarded along to the WAN. In that event, an outbound VPN engine 230 is provided that provides encryption and/or encapsulation of WAN outbound data. The engine 230 includes an outbound VPN processor 232 that encrypts and encapsulates the data based on instructions from the protocol 234 and the outbound security associate database 236, in a manner similar to the inbound VPN engine 210 (described above). In one exemplary embodiment, the security policies in place in the outbound security associate database may be adapted to match the security policies of the firewall 220. Once the data is encrypted it is sent to the transmission interface 230 and leaves out onto the WAN 240.

Figure 3:
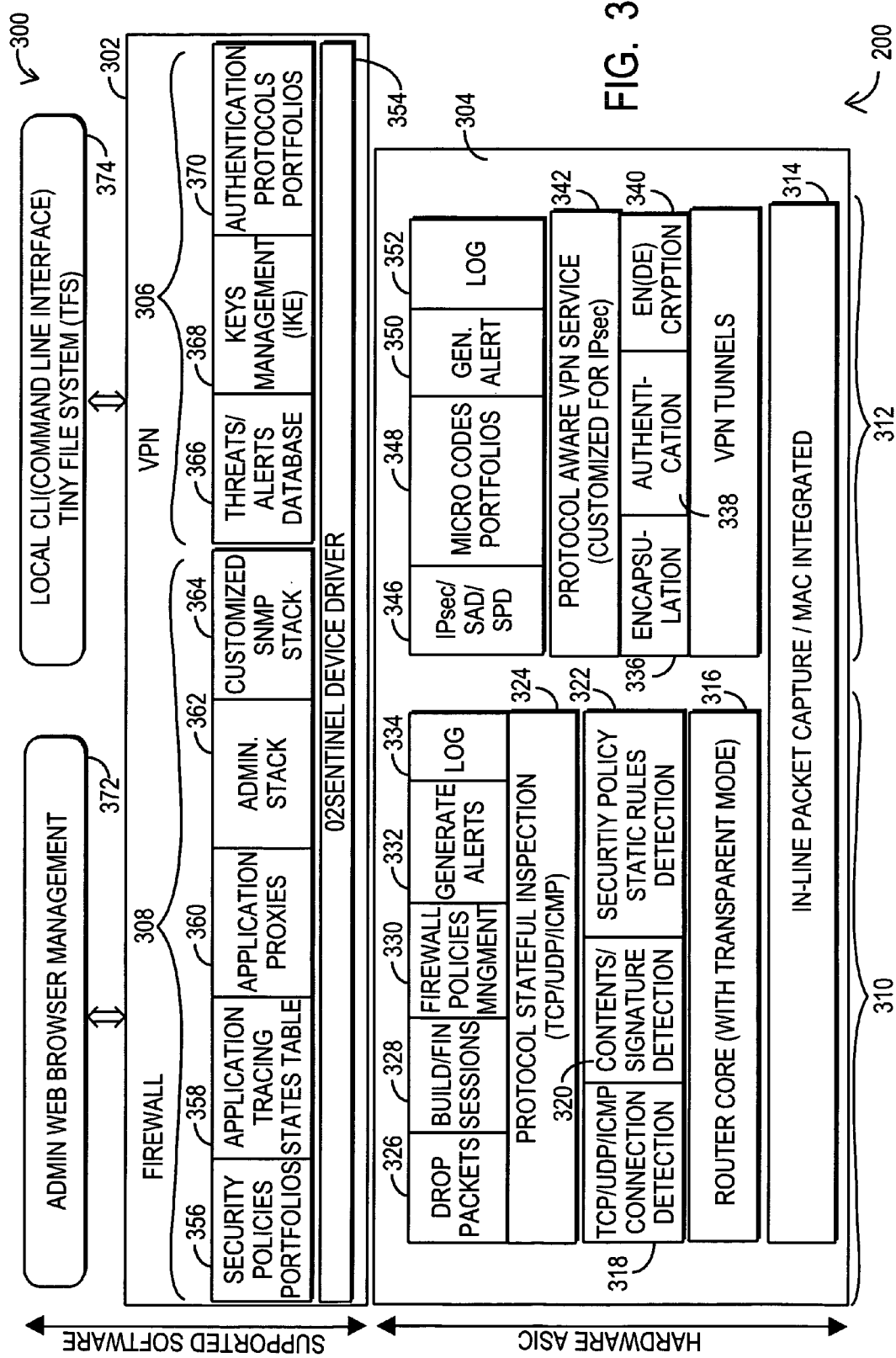
FIG. 3 is an exemplary block diagram of the software and firmware components of the firewall/VPN integrated system according to the present invention.

FIG. 3 is an exemplary block diagram 300 of the software and firmware components of the firewall/VPN integrated system according to the present invention. Generally, the software portions are set out at 302 and the hardware (ASIC) portions are set out at 304. The hardware and software associated with the firewall are set out at 310 and 308, respectively, while the hardware and software associated with the VPN are set out at 312 and 306, respectively. As set out above, the present invention utilizes hardware and software to increase overall efficiency. As a general matter, processes that are highly repetitive and/or mathematically intensive are formed in hardware, while other processes are performed using software. Each of the processes in the hardware platform 304 may comprise one or more distributed RISC-type processors adapted to perform the stated tasks, although other processor implementations are equally contemplated herein. It should be understood at the outset that the present invention provides a layered approach to both hardware and software functionality, as indicated by the different layers depicted in FIG. 3. Of course, those skilled in the art will recognize that FIG. 3 represents only one exemplary approach, and that other layered arrangements can be made without departing from the spirit and scope of the present invention. Each of the blocks of FIG. 3 is described more fully below.

Firewall Hardware Platform

The In-Line Packet Capture/MAC integrated block 314 is operable to receive traffic from the network, where the frame is the unit in this level. The router core 316 ensures that the packets will be forwarded according to different destination addresses and associated security measures, based upon either Firewall or VPN (virtual private network). The TCP/UDP/ICMP connection detection block 318 is adapted to determine the connection has been state fully traced. It can be adapted to make hash approach, then search if the coming packet has been in the traced and registered connection. It can be assumed the packets are save proven if they are within these state fully traced connection, then forward those packets to expedite this security measure.

The Contents/Signature detection block 320 is adapted to perform real time analysis of the 144 bytes of information of incoming data packet to determine if a limited number of patterns exists within incoming packets, which may be recognized codes of viruses or worms. The Security Policy static rules detection block 322 is adapted to provide static packet filtering function. The static feature means this packet filtering investigates the current single packet instead of looking the correlation or context of preceding packets or afterward. The Protocol Stateful Inspection (TCP/UDP/ICMP) block 324 is adapted to recognize the connection by inspecting its protocol's dynamics, so different applications using TCP or UDP, or ICMP can use this block to analyze incoming data. After the analysis contribution of this component, it will communicate with TCP/UDP/ICMP connection detection component to work out the speed connection check.

The drop packets block 326 receives results from the lower layers (324, 318, 320 and 322) to generate pass or deny decisions according to the security policies. The Build/Fin Sessions block 328 parses and tracks the beginning and ending of connection or session. Since the starting of TCP connection has states transition for two ends of connection, thus the security of TCP connection can rely on these states transition to close state to trade off for the performance. By this stateful tracking, the present invention utilizes hardware speed to monitor and lookup these connection building, lookup and tearing down status. The Firewall Policies Management block 330 generally defines the hardware storage of security policies, which may include internal memory storage. The generate alerts block 332 generates specific events for the alerts by creating associated Interrupt events to software stack. The stores data according to different security policies or rules setup and individual statistic the packets for the software generated log reports.

VPN Hardware Platform

The Protocol Aware VPN engine 342 includes several hardware-core embedded function parts, including the Encapsulation function block 336, Authentication block 338, and En(de)cryption block 340. For flexibility and security concerns, distributed RISC-oriented proprietary cores may be used in this VPN engine. By changing the micro-codes for each individual micro-processor, the different tasks executed in this VPN engine will be different according to different protocols required, for example higher performance of IPsec protocol for IPv4 or IPv6.

The IPsec SADB/SPD block 346 includes hardware storage of IPsec tunnel attributes data base, and rule selectors. Every packet within tunnel needs to reference this data base to come out actions employ into this packet for IPsec protocol. This component may be optimized for IPsec protocol purpose. The contents of this database are from the tunnel negotiating via an IKE process. The Microcodes profiles block 348 holds different micro-codes for different security protocols. The Generate Alert block 350 is adapted to create Alerts based upon selected criteria, for example, the live time expiring of tunnel, an encounter with malicious encrypted packets, unsuccessful processing packets due to tunnel synchronization, etc. The Log 352 hardware statistics supports general logs VPN related and by every tunnel base.

Software Platform

The Device Driver 354 provides the interface between software 302 and hardware 304. The securities policies portfolios block 356 provides the management software for the deployment of security policies. The Application tracing states table block 358 is the software component to provide detailed investigation to see which applications use the TCP/UDP/ICMP protocol. Then according to different application requirements and its stateful inspection, this software component may create associated gates in the firewall system for secure protection purpose. The Application Proxies block 360 is generally located at the Kernel level to provide more detailed investigation according to application level. This process can re-assembly the flows and contexts of in-line network traffics to make more detailed content analysis or pattern searching for the database of virus or worms, or filter unwanted commands. The Administrative software stack 362 executes the administration tasks for the system. These tasks include firewall systems and VPN engine systems. The SNMP (simple network management protocol) stack 364 is provided to execute the SNMP according to general RFC requirement. This component is the interface for the general network device or network software stack to get the status or any statistics or logs in the system.

The Threats/Alerts database 366 is provided to collect threats or alerts from hardware and software. These events can be stored in database form, to permit easy interface with a database application deployed above this kernel. The-7 Auto Keys/SA Management (IKE/ISAMP) block 368 provides the main protocols of IPsec to manually or auto negotiate keys and SA (security attribution) according to RFC2408 requirement. This component is associated with IPsec functions. The Authentication protocols portfolios 370 is provided to support IPsec authentication requirement. It may include message authentication protocol (HMAC-96) [RFC-2104] within ESP (Encapsulating Security Payload) and AH (Authentication Header). The goal of authentication algorithm is to ensure that the packet is authentic and can not be modified in transit.

The administrative Web Browser Management provides Web based management GUI (graphic user interface) component. In the exemplary system, the system general CPU will host web server under HTTPS protocol, the management web page will be stored in this web server. All configuration and management process for the system can be collaborated within this page point. By using socket layer SSL (Secure Sockets Layer), the management web page can be browsed remotely (in WAN host), or local secure LAN host with the encrypted connection. (i.e. the connection uses the chosen encryption algorithm to provide high degree privacy). The Local CLI(command line interface)/Tiny File System(TFS) 374 is adapted to provide local access with command line and configuration files interaction.

Figure 4:
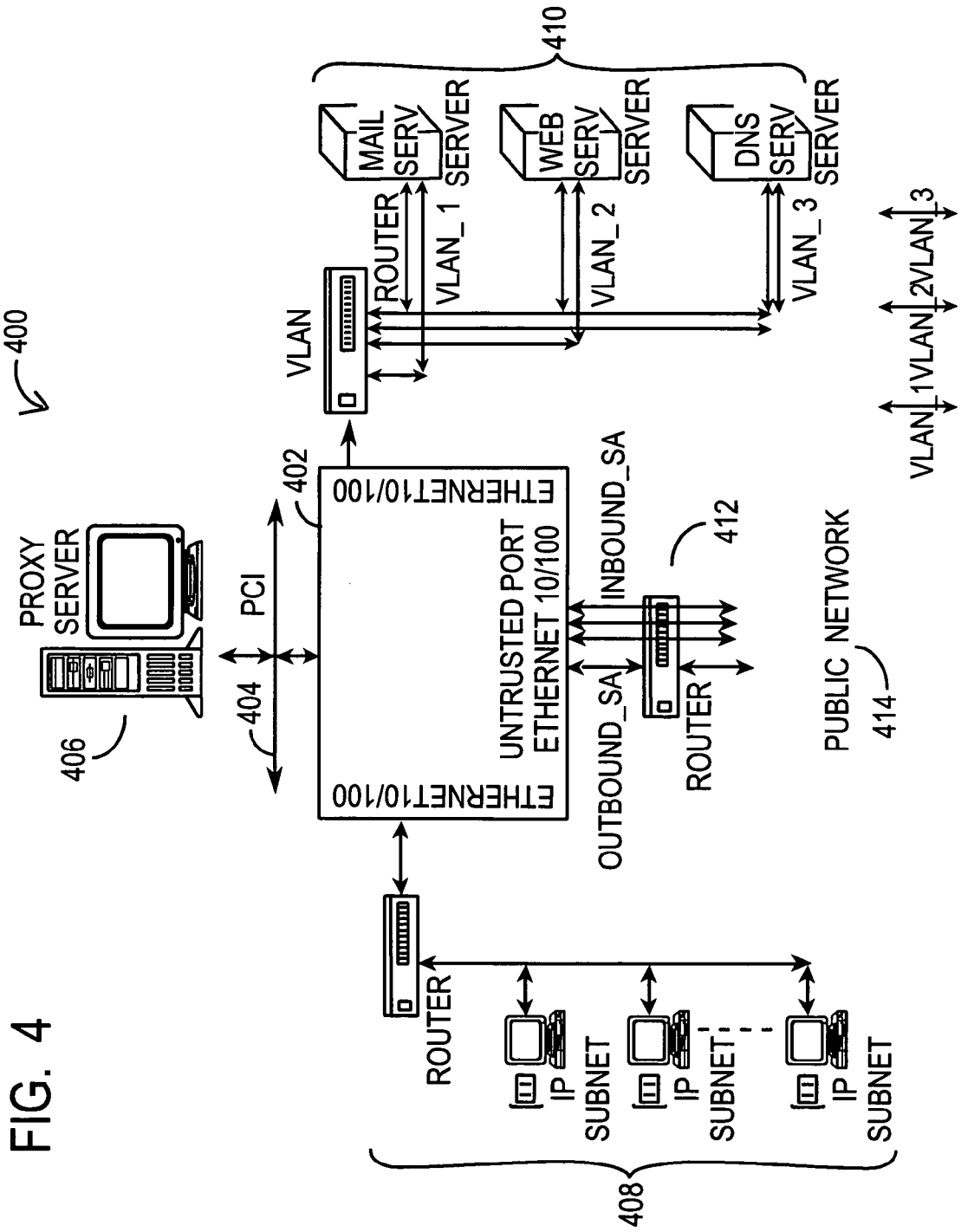
FIG. 4 is a detailed network-level block diagram of an exemplary implementation of the firewall/VPN integrated system according to the present invention.

FIG. 4 is a detailed network-level block diagram 400 of an exemplary implementation of the firewall/VPN integrated system according to the present invention. The firewall/VPN system 402, as described above, is employed as the access control module between the public network (WAN) 414 and one ore more LAN networks 408 and/or 410. In this example, the system is employed on a proxy server 406 via a conventional PCI bus 404. The router and other portions of this figure are self-explanatory to those skilled in the art.

System Overview and Specific Exemplary Implementations

As a summary, the following description details the present invention with reference some specific embodiments as depicted in FIGS. 2, 3 and 4. These embodiments are only exemplary and not intended to limit the present invention. The present invention provides a system-on-chip solution for high performance Firewall with integrated VPN. The firewall portion may be implemented as a coded system to provide multiple layers of static/dynamic packer filtering engines with different granularity of real-time policies inspection and flexible rule policies management. Besides the static/dynamic packet filtering for the sophisticated rule inspection, it has "Statefull Inspected" TCP/UDP connection match engine. The present invention can therefore be adapted to specifically expedite packet Filtering functions for the packets within established TCP/UDP connection.

For the rare virus or worms with deep dangerous content over the 144 bytes range that the hardware packet filtering system can not cover, the system then routes packets, along with the pre-analysis results, to Protection Proxies run on a CPU (or NPU). The protection proxies use a hardware engine to analyze the header and contents and includes pre-analysis processing, thereby reducing the working load of CPU (or NPU) in the analysis or processing of individual packets.

Using hardware, the firewall of the present invention can be adapted to include 3 Gbs Ethernet link wire-speed and ~200 Mbs 3DES VPN and IPsec to fit all aspects of high security demands in the modem network infrastructures.

Exemplary functionality of various components of the hardware and software are described below:

1. Router Core and Configure Ports.

This router core 316 provides the basic routing function to multiple logic ports in response to different packets. For example, as depicted in FIG. 4, the system 402 can be connected to four different ports: one is an untrusted port which is connected to Internet router, one is a trusted port, one is a DMZ port, one is a CPU host port and one optional NPU port. Every port has its own IP level subnets (except the NPU port which may be configured in routing table manually). To make use of the high processing bandwidth of the present invention, the port structure may be adapted to provide two configure settings, for example, one Gbs port or multiple 10/100 Mbs ports. There are two kinds of ports adapted to handle untrusted traffic and trusted traffic. If these two flexible ports are configured as 10/100 Mbs, the ingress ports will be in aggregated by the router and processed as a single logical port. Likewise for egress condition, the ports will be logically aggregated as one port, where the choice of output port may be according to the addresses of the egress packets.

2. Flexible and Scalable Four Layer Firewall System.

The firewall includes three layers of hardware oriented static/dynamic packet filtering engines, and one layer of customized virus or worms detection proxies. Every layer of this protection system has its own features and contributes different level security shields.

The first layer is Header Match packet filtering Engine (HME for short) which mainly handles the pattern match for header contribution and their combination from L2, L3, L4 headers. Since the header fields have some degree of granularity and expectation in header pattern, this layer of packet filtering is generally more straight-forward. Therefore, rules compilation and management in this layer can be implemented in a simple fashion, thereby reducing the efforts of the IT user. Without sacrificing the high bandwidth performance for this simplicity, this layer is adapted to handle traffic in a sustained Gbs (giga bits per second) bandwidth state.

The first layer (HME) may not be able to be effectively identify suspect virus or worms. Accordingly, the present invention includes a second layer in the firewall embedded with a Contents Match hardware packet filtering Engine (CME for short). This engine analyzes the scope of the 144 bytes.

The third layer in firewall system is different sets of application proxies run in the CPU (or NPU). For the intimate limitation of pure hardware packet filtering engines, it can not cover the rare pattern detection need to locate the patterns over 144 bytes. Even this deep layer protection provided in CPU software proxies, the results of these first layer and second layer contents analyzing still can make much contribution when the packet needs to forward to CPU port and comes along with this "pre-analysis" results. This architect approach can tremendously off-load the processing demands from general CPU running different proxies in the case of deeper layer virus detection.

A Session Match Engine (SME) is provided as the fourth layer in firewall system. The SME includes an embedded Session Look Up Table which stores the TCP/UDP connections setup by the "stateful inspection" logic. The connection setup procedure in TCP/UDP goes through 3 way handshaking, those TCP/UDP handshaking control message packets will be caught by the system's SME, then forward to the general CPU for tracking the setup progress. After the procedure of setup connection is performed and recorded by CPU, this layer can program the connection socket address into Session Look Up Table for future packets received on this connection. The TCP/UDP packets flowing through this layer may only be hashed and searched in this Session LookUp Table to check if within the setup connections (sessions) to decide pass or drop to speed TCP/UDP connection checking.

All these four firmware blocks are integrated to provide high security while permitting the system to be flexible and fully scalable.

3. Protocol Aware VPN Engine

In this VPN engine, an array of micro-coded microprocessors are the foundation to provide the flexibility of different security protocols (in addition to Ipsec). The microprocessors include programmable instruction memory to permit updates of multi-protocol functions.

For this, high bandwidth performance is designed into the VPN engine. There are two independent pipelines for processing inbound and outbound VPN traffics. Every pipeline used array of micro-coded IPs to execute the tasks assigned. Every pipe has one independent programmable IP for executing specific tasks assigned in this pipe and task done within the work period to provide sustaining bandwidth. This VPN engine executes all kinds of VPN security functions include data integrity and data origin by different micro-code programming. Its primary authentication provided by the hardware specialized HMAC-MD5-96, and HMAC-SHA-1-96. The primary algorithm of data confidentiality will rely on the hardware core of DES/3 DES, AES, so the latency of processing can be positively predicable. For the flexibility concern, one pipe IP will provide one external system bus which can interface with external proprietary en(de)cryption chips without any public system bus overhead.

Also, the system may include an integrated smartcard reader, which can efficiently provide the storage of seeds for periodically generating shared keys or key pairs while establishing VPN channels phase.

The present invention features an Input Buffered Output Queued Architecture, which can eliminate the head of line blocking problem in the router services. Input Buffer Management Unit stores the received IP packets in a modern Linked List Structure, which allows for easy access, modification by the forwarding modules. The Output Queuing scheme also provides support for per port bandwidth management functions. These Bandwidth Management Functions are implemented as an integral part of the Output Queuing Function module.

The policy-based NA(P)T also gets the action from matched-policy to execute the relative NAT translation of the IP source address, as well as TCP/UDP ports translation and recovery.

The present invention also provides QoS (Quality of Service) supports. This quality of services ability will depend on the policies setup and matched in Policy Engine and the TOS field of packet header acting as DiffServ stamp and the VLAN tag priority changes the queuing priority for every egress packet. Through the policy classification process and DiffServ mapping, the packet will get different queuing strategies for its necessary bandwidth arranged to meet its traffic management requirement.

The system supports both redundant failover and load balancing by a ports mirroring scheme and parts of BGP/OSPF route protocol. A secure tunnel requires that certain states of information be maintained and synchronized in a periodic manner. Port Mirroring communicates the state information with the alternative gateway by using one of Ethernet ports and BGP/OSPF messages transit so the switching over time needed will be kept to a minimum.

The modular software stacks of the present invention permits the system to operate at high efficiency. In balancing security and optimum performance trade-off, the embedded software stacks provide several primitive proxies in its Lunix based kernel. The software can also include the "transparent proxying" or "hybrid proxying" features which automatically starts packet filtering by hardware and redirects the packets to an associated proxy. One advantage of this approach is that it is not visible from the user's perspective and they do not have to configure the system to communicate with the external services. Instead, the system intercepts the packets, and redirects to the system proxy stacks by the user who configured it. With this versatile structure, the system can have the more sophisticated security measures offered by proxy with the speed performance of the hardware packet filter. Exemplary proxies included in system proxy stacks are FTP proxy, Telnet proxy, and mail proxy (POP, POP3, etc.) providing high application-aware ability with virus-preventive protection.

In the configuration management aspects, the software has centralized management control, which can access all components of the distributed system. For example, the software may include a Command Line Interface to provide the scripting form accommodating multiple Commands, Web-based Interface that may comprise an illustrative and intuitive GUI, a configuration file which can be created in a central controlled management station and upload to VPN gateway when needed, and an Application Programming Interface(API) to enable third-party vendors to develop management software for the network provisioning system.

Integrated features of the present invention include Hardware Firewall/VPN integrated ASIC chip, configuring 1 Gbs port for Enterprise level link or flexible 10/100 Mbs Ethernet ports, flexible external interface with proprietary en(de)cryption ASIC chip if applicable, PCI-66/33 MHz interface with general CPU, proprietary interface bus with NPU if applicable.

Exemplary performance features of the present invention include a Firewall throughput of sustained 2.1 Gbs Ethernet line speed and real-time header or content analysis, two layers of hardware packet-filtering engines adapted to use deterministic 12 clocks per packet (both Hardware packet filtering engines support dynamic packet filtering scheme), TCP/UDP Connection filtering system operating at 800 Mbs, VPN throughput—630 Mbs/3DES, 1 Gbs/DES.

Exemplary Firewall System Features:

On-chip 1000 policies and scalable amount of policies supported with external SRAM array. Packet filtering analysis 14-4 bytes contents of packet starting from IP layer in line speed to provide no-overhead contents-aware security. All packet filtering engines support policies change dynamically according to received packets contents. Connection filtering engine provides stateful inspection of TCP/UDP handshake establishment to 25,000 connections, offered by the hardware searching in Session LookUp Table. MAC-address and ingress port ID engagement for detection topology changes. Policy based NAPT(network address/port translation) to support many to one IP address for extranet VPN application and internal address hidden. Transparent switch mode in disengaged NAT. Traffic flow and rate shaping controlled by individual policy granularity. Fine granularity and flexible policy setup prevent unlawful attacks with ICMP coven channel. High speed Denial of Service protection-defend against attacks with TCP-SYNFLOOD, Ping of Death, TearDrop, etc.

Exemplary VPN Features:

Full support IPsec security services for IPv4 traffics. Support L2TP within IPsec. Support around 1000 on chip tunnels delivering high speed and diverse business-class capabilities for cross-abroad, managed security. Authentication services with HMAC-MD5-96, and HMAC-SHA-1-96 in 800 Mbs. Data confidentiality with DES/3DES, and external interface bus with proprietary en(de)cryption ASIC chip. Can accommodate VLANs implemented by 801.1 Q for increased security measures.

Exemplary QoS Traffic Management Features:

Traffic shape control, Guaranteed bandwidth, and Voice over IP. Priority bandwidth DiffServ Stamp.

Other Exemplary Features of the System:

Stateful backup failover capability for mission-critical applications. Configure Gbs port or 10/100 Mbs ports, which can offer the enterprise-class bandwidth link. The multi-10/100 Mbs ports can be adapted to provide link aggregation and automatic failover for defective physical links. 0.15 urn advanced CMOS technology.

Of course, other features and advantages will be apparent to those skilled in the art. The forgoing system overview represents some exemplary implementations, but other implementations will be apparent to those skilled in the art, and all such alternatives are deemed equivalent and within the spirit and scope of the present invention, only as limited by the claims.

What is claimed is:

1. An integrated firewall/VPN system, comprising:
   at least one wide area network (WAN);
   at least one local area network (LAN); and
   an integrated firewall/VPN chipset configured to send and receive data packets between said WAN and said LAN, said chipset comprising:
   a firewall comprising a first layer including a header match packet filtering engine configured to provide pattern matching in selected headers of data, a second layer including a contents match packet filtering engine configured to analyze the scope of at least one data packet, a third layer including at least one application proxy configured to provide additional pattern matching using a hardware engine configured to provide pre-analysis processing to reduce the workload of a central processing unit (CPU) and a fourth layer including a session match engine configured to store a TCP/UDP connection setup in a look-up-table and to forward the setup progress to said CPU for tracking;

a VPN configured to provide security functions for data between said LAN and said WAN, wherein said security functions are selected from the group consisting of encryption, decryption, encapsulation, and decapsulation of said data packets, said VPN including a VPN packet buffer configured to receive at least one of said data packets and to forward said at least one data packet to an inbound VPN processor configured to decrypt and decapsulate said at least one data packet, said VPN further including an inbound security database having a database of tunnels configured to provide said inbound VPN processor with tunnel information used to decrypt and decapsulate said at least one data packet, said VPN further including protocol instructions having microcodes configured to instruct said VPN processor to decrypt and decapsulate said at least one data packet according to a user-defined security procedure; and an interface configured to determine if said data packets are plain text or cipher text, said interface further configured to forward a preselected number of bytes to said firewall if said data packets are plain text, said interface further configured to forward said data packets to said VPN if said data packets are cipher text.

2. The system as claimed in claim 1, wherein said chipset further comprises a router adapted to route data between said WAN and said LAN.

3. The system as claimed in claim 1, wherein said firewall is configured to provide static and/or dynamic data packet filtering.

4. The system as claimed in claim 3, wherein said header match packet filtering engine is configured to provide pattern matching in selected headers of said data and their combination from L2, L3 and L4 headers.

5. The system as claimed in claim 1, wherein said chipset is further configured to analyze access control functions based on preselected bytes of said data packets.

6. The system as claimed in claim 5, wherein said preselected bytes comprise the first 144 bytes of said data packet.

7. The system as claimed in claim 1, wherein said firewall further includes access control functions comprising user-defined access control protocols.

8. A firewall/VPN integrated circuit (IC), comprising:

a router core configured to interface between at least one untrusted network and at least one trusted network to send and receive data packets between said untrusted and said trusted networks;

a firewall system, comprising a first layer including a header match packet filtering engine configured to provide pattern matching in selected headers of data, a second layer including a contents match packet filtering engine configured to analyze the scope of at least one data packet, a third layer including at least one application proxy configured to provide additional pattern matching using a hardware engine configured to provide pre-analysis processing to reduce the workload of a central processing unit (CPU) and a fourth layer including a session match engine configured to store a TCP/UDP connection setup in a look-up-table and to forward the setup progress to said CPU for tracking;

a VPN configured to provide security functions for data between said at least one untrusted and said at least one trusted network, wherein said security functions comprise encryption, decryption, encapsulation, and decapsulation of said data packets, said VPN including a VPN packet buffer configured to receive at least one of said data packets and to forward said at least one data packet to an inbound VPN processor configured to decrypt and decapsulate said at least one data packet, said VPN further including an inbound security database having a database of tunnels configured to provide said inbound VPN processor with tunnel information used to decrypt and decapsulate said at least one data packet, said VPN further including protocol instructions having microcodes configured to instruct said VPN processor to decrypt and decapsulate said at least one data packet according to a user-defined security procedure; and an interface configured to determine if said data packets are plain text or cipher text, said interface further configured to forward a preselected number of bytes to said firewall if said data packets are plain text, said interface further configured to forward said data packets to said VPN if said data packets are cipher text.

9. The IC as claimed in claim 8, wherein said firewall system is configured to provide static and/or dynamic data packet filtering.

10. The IC as claimed in claim 9, header match packet filtering circuit is configured to provide pattern matching in selected headers of said data and their combination from L2, L3 and L4 headers.

11. The IC as claimed in claim 8, wherein said firewall system is further configured to analyze access control functions based on preselected bytes of said data packets.

12. The IC as claimed in claim 11, wherein said preselected bytes comprise the first 144 bytes of said data packet.

13. The IC as claimed in claim 8, wherein said firewall system further includes access control functions comprising user-defined access control protocols.

14. A method of providing firewall access control functions, comprising the steps of;

defining one or more access control protocols;

receiving a data packet at an interface and determining if said data packet is plain text or cipher text, and forwarding a preselected number of bytes to a firewall system if said data packets includes plain text and forwarding said data packets to a VPN if said data packet includes cipher text;

selecting a certain number of bytes of said data packet if said data packet includes plain text;

processing said selected bytes using said access control protocols via said firewall system, said firewall system comprising a first layer including a header match packet filtering engine configured to provide pattern matching in selected headers of data, a second layer including a contents match packet filtering engine configured to analyze the scope of said data packet, a third layer including at least one application proxy configured to provide additional pattern matching using a hardware engine configured to provide pre-analysis processing to reduce the workload of a central processing unit (CPU) and a fourth layer including a session match engine configured to store a TCP/UDP connection setup in a look-up-table and to forward the setup progress to said CPU for tracking; and receiving at least one cipher text data packet at a VPN configured to provide security functions for data between said LAN and said WAN, wherein said security functions are selected from the group consisting of encryption, decryption, encapsulation, and decapsulation of said at least one cipher text data packet, said VPN including a VPN packet buffer configured to receive said at least one cipher text data packet and to forward said at least one cipher text data packet to an inbound VPN processor configured to decrypt and decapsulate said at least one cipher text data packet, said VPN further including an inbound security database having a database of tunnels configured to provide said inbound VPN processor with tunnel information used to decrypt and decapsulate said at least one cipher text data packet, said VPN further including protocol instructions having microcodes configured to instruct said VPN processor to decrypt and decapsulate said at least one cipher text data packet according to a user-defined security procedure.

* * * * *